(12) United States Patent
Tamaru et al.

(10) Patent No.: US 7,586,525 B2
(45) Date of Patent: Sep. 8, 2009

(54) NOISE REDUCTION APPARATUS, METHOD AND PROGRAM

(75) Inventors: Masaya Tamaru, Asaka (JP); Kazuhiko Takemura, Asaka (JP); Makoto Ooishi, Asaka (JP); Kenkichi Hayashi, Asaka (JP); Seiji Tanaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 572 days.

(21) Appl. No.: 11/207,883

(22) Filed: Aug. 22, 2005

(65) Prior Publication Data

US 2006/0038899 A1    Feb. 23, 2006

(30) Foreign Application Priority Data

Aug. 23, 2004    (JP)    ............... 2004-242134

(51) Int. Cl.
     *H04N 5/217*      (2006.01)
     *H04N 5/228*      (2006.01)
     *G06K 9/40*      (2006.01)

(52) U.S. Cl. ............... 348/241; 348/222.1; 382/260

(58) Field of Classification Search ............... 348/241, 348/224.1, 222.1, 207.99; 358/463, 3.26, 358/3.27; 382/260–262, 275

See application file for complete search history.

(56) References Cited

U.S. PATENT DOCUMENTS 5,844,627 A * 12/1998 May et al. ............... 348/607
5,892,540 A * 4/1999 Kozlowski et al. ............... 348/300
6,665,010 B1 * 12/2003 Morris et al. ............... 348/297
2005/0073592 A1 * 4/2005 Aotsuka ............... 348/224.1

FOREIGN PATENT DOCUMENTS

| JP | 11-146410 | A |   | 5/1999 |
| JP | 11-168643 | A |   | 6/1999 |
| JP | 2002-10108 | A |   | 1/2002 |
| JP | 2002-176567 | A |   | 6/2002 |
| JP | 2002176567 | A | * | 6/2002 |
| JP | 2003-141531 | A |   | 5/2003 |
| JP | 2004-54884 | A |   | 2/2004 |
| JP | 2004-187203 | A |   | 7/2004 |

\* cited by examiner

*Primary Examiner*—Tuan V Ho
*Assistant Examiner*—Euel K Cowan
(74) *Attorney, Agent, or Firm*—Birch, Stewart, Kolasch & Birch, LLP.

(57) ABSTRACT

CCD-RAW data obtained by sensing the image of a subject is applied to a first noise reduction circuit via a offset correction circuit, a gain correction circuit, a linear matrix circuit and a gamma correction circuit. Uncorrelated noise is removed from the CCD-RAW data in the first noise reduction circuit. The CCD-RAW data is subjected to synchronization (color interpolation) in the synchronization processing circuit, and luminance data Y and color difference data C is generated by an RGB-YC conversion circuit. The generated luminance data Y and generated color difference data C is subjected to noise reduction processing on a per-frequency-component basis in the second noise reduction circuit. Suitable noise reduction processing conforming to the state of image data before and after synchronization processing is executed.

8 Claims, 17 Drawing Sheets

AFTER DIVISION INTO COLOR COMPONENTS

Fig. 9  IF UNCORRELATED NOISE IS PRESENT

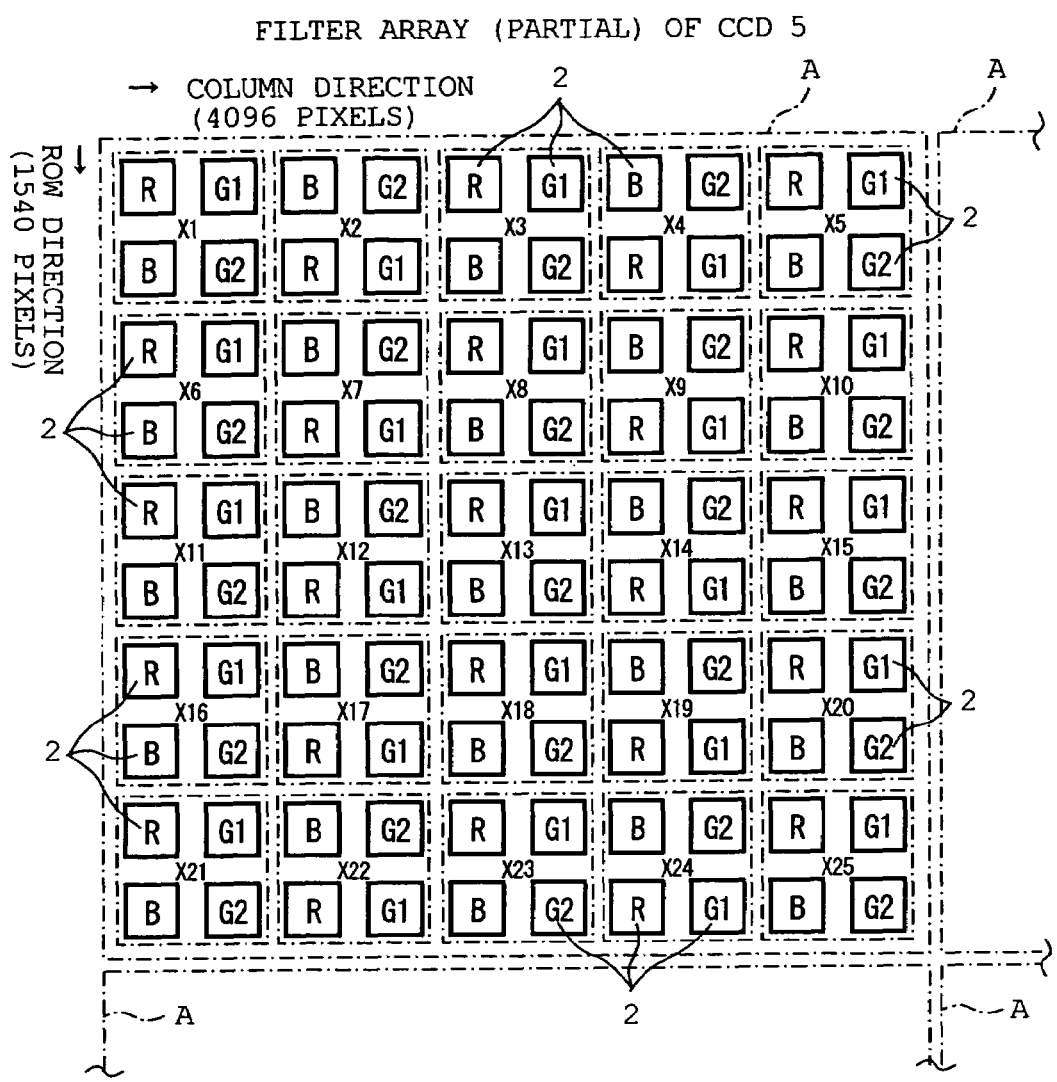

US 7,586,525 B2

NOISE REDUCTION APPARATUS, METHOD AND PROGRAM

BACKGROUND OF THE INVENTION

1. Field of the Invention

This invention relates to a noise reduction apparatus and method and to a noise reduction program.

2. Description of the Related Art

CCDs used in digital still cameras are continuing to be improved in terms of number of pixels and sensitivity. The influence of noise, therefore, has become a problem.

Although there is prior art wherein noise reduction processing is executed multiple times (see the specification of Japanese Patent Application Laid-Open No. 2003-141531), there are instances where effective noise reduction cannot be performed merely by executing processing multiple times.

SUMMARY OF THE INVENTION

Accordingly, an object of the present invention is to reduce noise effectively.

According to the present invention, the foregoing object is attained by providing a noise reduction apparatus comprising: a first noise removal device (first noise removal means) for inputting color image data (CCD-RAW data) representing an image in which each pixel of a number of pixels constituting one frame of an image has one color component from among a plurality of color components, the color components having a distribution that is systematic, and removing uncorrelated noise contained in the color image data that has been input; a color interpolation device (color interpolation means) for inputting the color image data from which uncorrelated noise has been removed by the first noise removal device, and executing color interpolation processing of the input color image data in such a manner that each pixel of the number of pixels constituting the one frame of the image will have all of the color components of the plurality of color components; and a second noise removal device (second noise removal means) for inputting the color image data that has been subjected to the color interpolation processing by the color interpolation device, and removing noise contained in the color image data that has been input.

The present invention also provides a method suited to the noise reduction apparatus described above. Specifically, the present invention provides a noise reduction method comprising the steps of: inputting color image data representing an image in which each pixel of a number of pixels constituting one frame of an image has one color component from among a plurality of color components, the color components having a distribution that is systematic, and removing uncorrelated noise contained in the color image data that has been input; inputting the color image data from which uncorrelated noise has been removed and executing color interpolation processing of the input color image data in such a manner that each pixel of the number of pixels constituting the one frame of the image will have all of the color components of the plurality of color components; and inputting the color image data that has been subjected to the color interpolation processing and removing noise contained in the color image data that has been input.

The present invention also provides a program for implementing the noise reduction method described above.

In accordance with the present invention, uncorrelated noise is removed from color image data representing an image in which each pixel of a number of pixels constituting one frame of an image has one color component from among a plurality of color components, the color components having a systematic distribution. Color interpolation processing is applied to the color image data from which the uncorrelated noise has been removed. Noise is further removed from the color image data that has been subjected to the color interpolation processing.

In accordance with the present invention, uncorrelated noise is removed from color image data that prevails before the application of color interpolation processing thereto. Since color interpolation processing has not been applied to this color image data, removal of uncorrelated noise can be performed effectively. Further, color image data that has been subjected to color interpolation processing undergoes noise removal without relation to uncorrelated noise. As a result, it is possible to remove noise of a specific frequency component. Since noise removal that conforms to the characteristics of the image data is performed rather than simply performing noise removal a plurality of times, highly effective noise removal can be realized.

By way of example, the second noise removal device is one that executes noise removal conforming to the frequency band of the color image data that has been input.

The color image data that is input to the first noise removal device represents an image in which each pixel of a number of pixels has one color component from among a plurality of color components of red, blue or green, by way of example. In this case, the apparatus further comprises a YC data generating device for generating luminance data and color difference data from the color image data that has been subjected to the color interpolation processing by the color interpolation device. The second noise removal device would remove noise contained in at least one of the luminance data and color difference data generated by the YC data generating device.

The first noise removal device inputs color image data that is output from a single-chip solid-state electronic image sensing device in which a number of optoelectronic transducers are arrayed, color filters each having a characteristic that passes light of one color component from among the plurality of color components being formed systematically, for each of the plurality of colors, on photoreceptor surfaces of respective ones of the optoelectronic transducers of the number of optoelectronic transducers.

It may be so arranged that at least one of processing for removing uncorrelated noise in the first noise removal device and processing for removing noise in the second noise removal device is executed based upon at least one of the characteristic of the solid-state electronic image sensing device and shooting information used when a picture has been taken using the solid-state electronic image sensing device.

The first noise removal device utilizes at least one of noncorrelativity of noise between neighboring pixels and noncorrelativity of noise between color components.

Other features and advantages of the present invention will be apparent from the following description taken in conjunction with the accompanying drawings, in which like reference characters designate the same or similar parts throughout the FIGURES thereof.

BRIEF DESCRIPTION OF THE DRAWINGS

FIGS. 16 and 17 each illustrate part of a CCD filter array.

DESCRIPTION OF THE PREFERRED EMBODIMENTS

A preferred embodiment of the present invention will now be described in detail with reference to the drawings.

Figure 1:
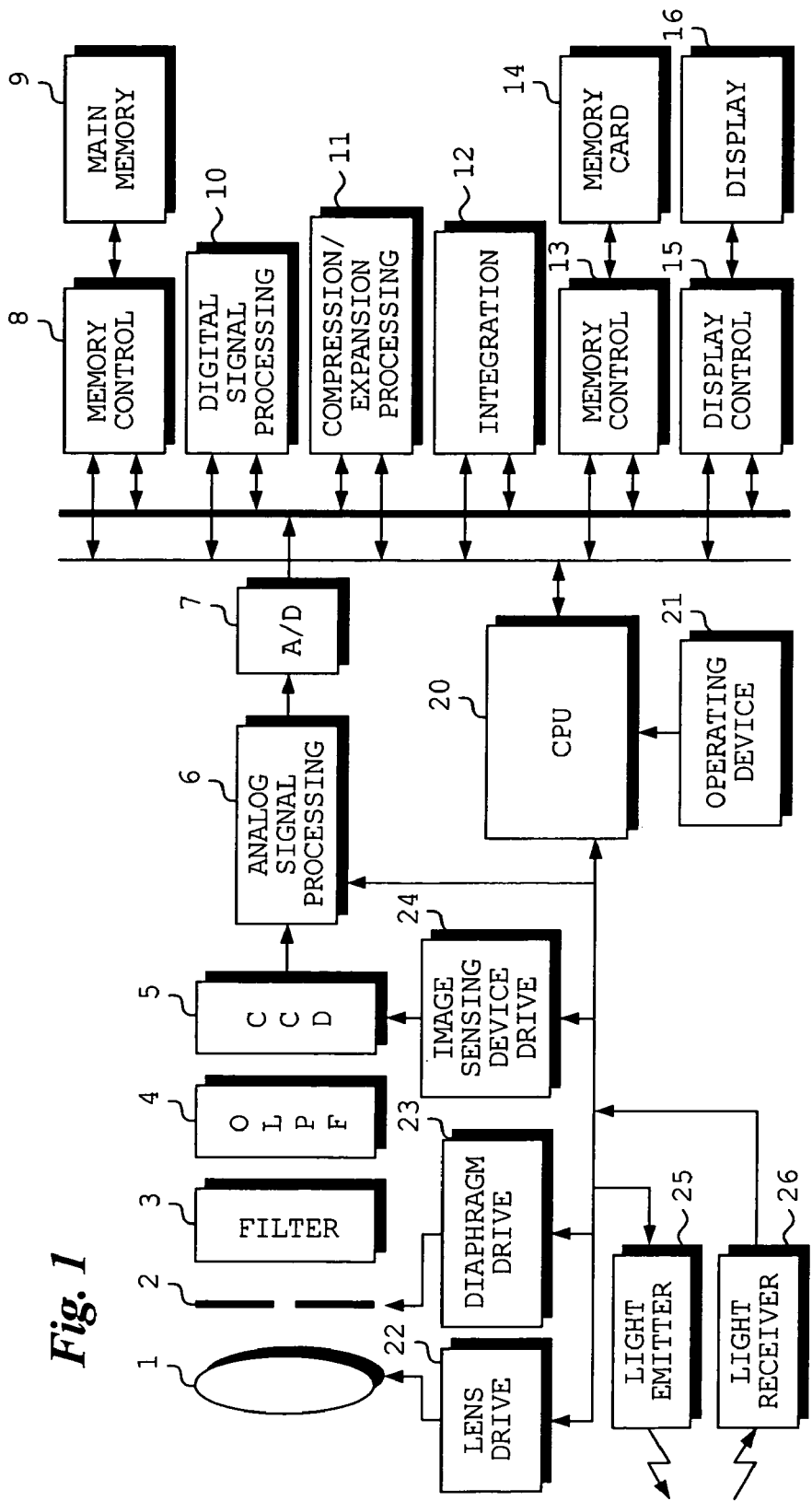
FIG. 1 is a block diagram illustrating the electrical structure of a digital still camera.

FIG. 1 is a block diagram illustrating the electrical structure of a digital still camera according to an embodiment of the present invention.

The operation of the overall digital still camera is controlled by a CPU 20.

The digital still camera includes an operating device 21 having a shutter-release button of two-step stroke type and a mode setting dial for setting an image sensing mode, a playback mode and a picture-taking scene. An operating signal that is output from the operating device 21 is input to the CPU 20. Further, the digital still camera is capable of flash photography and includes an electronic-flash light-emission circuit 25. Light that emerges from the electronic-flash light-emission circuit 25 illuminates a subject, whereupon light reflected from the subject is received by a light-receiving circuit 26. The amount of light emitted from the electronic-flash light-emission circuit 25 is controlled based upon the received-light signal from the light-receiving circuit 26.

Light is condensed by an image sensing lens 1 the position of which is controlled by a lens driving circuit 22. The condensed light is guided to a CCD 5 by a diaphragm 2, which is controlled by a diaphragm driving circuit 23, an infrared blocking filter 3 and an optical low-pass filter 4. The image of the subject is formed on the photoreceptor surface of the CCD 5.

The CCD 5 according to this embodiment has a number of photodiodes formed on a photoreceptor surface, as will be described in detail below. Filters that pass light of a red, green or blue color component are formed on the photoreceptor surfaces of the photodiodes. When the CCD 5 is driven by an image sensing device driving circuit 24, the CCD 5 outputs a video signal representing the image of a subject comprising a number of pixels each having any of a red, green or blue color component.

The video signal output from the CCD 5 is input to an analog signal processing circuit 6. The latter subjects the video signal to prescribed analog signal processing such as correlated double sampling and adjustment of CCD sensitivity variations and applies the processed video signal to an analog/digital converting circuit 7, which converts the video signal to digital image data (CCD-RAW data). The digital image data obtained by the conversion is applied to and stored temporarily in a main memory 9 by a memory control circuit 8.

The digital image data is read from the main memory 9 and input to a digital signal processing circuit 10. The latter subjects the data to prescribed digital signal processing. The signal processing performed in the digital signal processing circuit 10 will be described in detail below. The image data output from the digital signal processing circuit 10 is applied to a display unit 16 by a display control circuit 15. The image of the subject is displayed on the display screen of the display unit 16.

If the shutter-release button is pressed through the first step of its two-step stroke, the image data that has been recorded in the main memory 9 as described above is input to an integrating circuit 12, in which luminance data components are integrated. Data representing the integrated luminance data components is applied to the CPU 20, which proceeds to decide the aperture and shutter speed in such a manner that a suitable amount of exposure is obtained.

If the shutter-release button is pressed through the second step of its two-step stroke, the image data that has been recorded in the main memory 9 as described above is input to a compression/expansion processing circuit 11. The latter subjects the image data to compression based upon the JPEG (Joint Photographic Experts Group) standard. The compressed image data is recorded on a memory card 14 by a memory control circuit 13.

If the playback mode is set, compressed image data that has been recorded on the memory card 14 is read and applied to the compression/expansion processing circuit 11. The latter subjects the compressed image data to data expansion processing. The expanded image data is applied to the display unit 16 by the display control circuit 15, whereby the image represented by the image data recorded on the memory card 14 is displayed on the display screen of the display unit 16.

Figure 2:
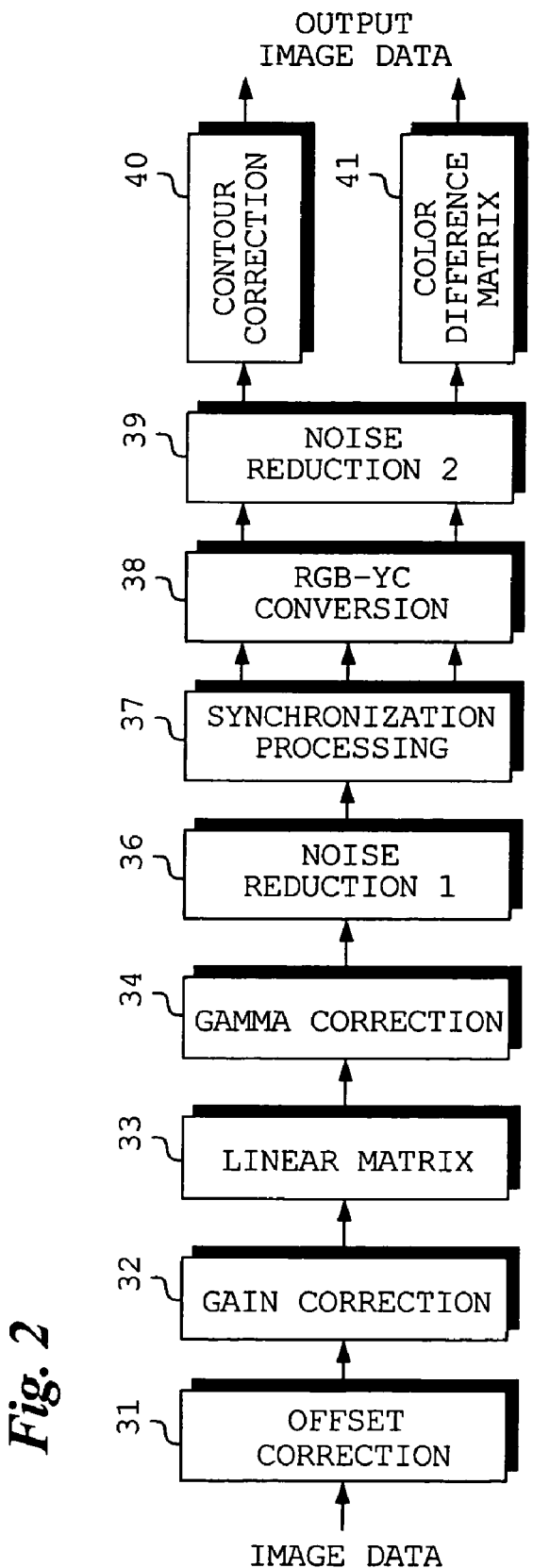
FIG. 2 is a block diagram illustrating the electrical structure of a digital signal processing circuit.

FIG. 2 is a block diagram illustrating the electrical structure of the digital signal processing circuit 10.

Image data that has been input to the digital signal processing circuit 10 is subjected to an offset correction in an offset correction circuit 31 and the corrected data is then input to a gain correction circuit 32. The latter applies a color balance adjustment to the image data input thereto. The image data output from the gain correction circuit 32 is subjected to a gamma correction in a gamma correction circuit 34 via a linear matrix circuit 33.

The image data that has undergone the gamma correction in the gamma correction circuit 34 is input to a first noise reduction circuit 36, which proceeds to execute processing to remove uncorrelated noise from the entered image data. The details of the noise reduction processing in the first noise reduction circuit 36 will be described later.

As mentioned above, each pixel constituting the image represented by the image data has any of a red, green or blue color component and does not have another color component. Accordingly, the image data output from the first noise reduction circuit 36 is applied to a synchronization circuit (color compensation circuit) 37, where other color components not possessed by pixels are generated. Color image data of R, G and B in which pixels have all of the color components of red, green and blue are output from the synchronization processing circuit 37 in parallel and input to an RGB-YC conversion circuit 38. The latter generates luminance data Y and color difference data C (Cr and Cb) from the R, G and B color image data and inputs the generated luminance data Y and color difference data C to a second noise reduction circuit 39. The latter executes noise reduction processing that conforms to a frequency characteristic input thereto. The details of the noise reduction processing in second noise reduction circuit 39 will be described later.

The luminance data Y that has been output from the second noise reduction circuit 39 is input to a contour correction circuit 40, and the color difference data C is input to a color difference matrix circuit 41. A contour correction is performed in the contour correction circuit 40, and a color correction is performed in the color difference matrix circuit 41. Luminance data Y that is output from the contour correction circuit 40 and color difference data C that is output from the color difference matrix circuit 41 becomes the output of the digital signal processing circuit 10.

Gain in the gain correction circuit 32 varies in accordance with an ISO sensitivity setting by the user or an automatic sensitivity setting. As a consequence, there are instances where noise increases uniformly in the overall image. Since the image data (CCD-RAW data) prior to the application of synchronization processing is in a state in which noise contained in a pixel has no correlativity between itself and an adjacent pixel (i.e., the noise is uncorrelated noise), uncorrelated noise can be removed efficiently in the first noise reduction circuit 36 prior to application of synchronization processing. Furthermore, since visually conspicuous noise exists from intermediate to high frequencies, the second noise reduction circuit 39 that operates after application of synchronization processing is capable of making this noise inconspicuous by reducing noise in this range of frequencies.

Similarly, in a case where the picture-taking scene has been set to scenery by the operating device 21, there are instances where gradation changes and half-tone noise increases from shadow portions. In such case it is effective to utilize the first noise reduction circuit 36 and remove uncorrelated noise in this region. Further, if the scenery mode has been set, there are cases where color noise increases owing the generation of highly saturated images. This means that removing noise with regard to color difference data by the second noise reduction circuit 39 after synchronization is effective.

Thus, prior to synchronization, the physical non-correlativity of image data is high and therefore noise removal processing utilizing non-correlativity is effective. After synchronization, noise reduction processing that takes visual characteristics (frequency components, color space, etc.) into consideration is effective. By thus executing noise reduction processing by different methods before and after synchronization processing, noise can be removed very effectively.

Figure 3:
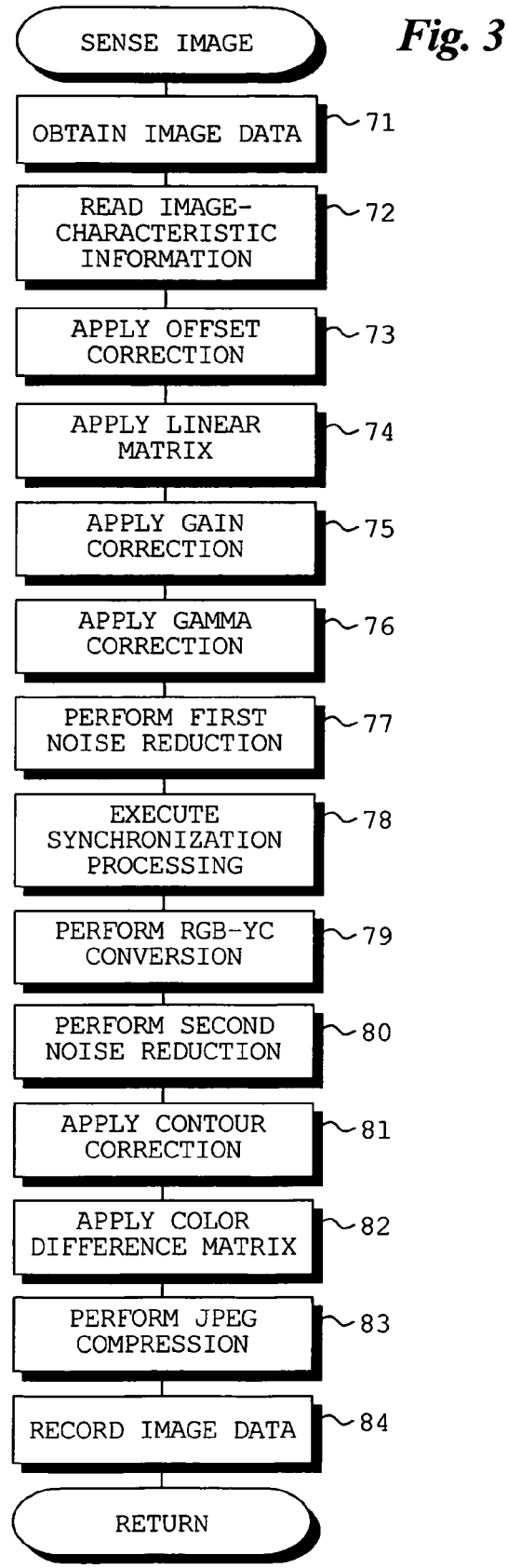
FIG. 3 is a flowchart illustrating image sensing processing.

FIG. 3 is a flowchart of digital signal processing.

Image data representing the image of a subject is obtained by sensing the image of the subject (step 71). Further, information representing image characteristics is read (step 72).

The image data that has been read is subjected to an offset correction (step 73) and linear matrix processing (step 74). Gain correction processing (white balance adjustment processing) (step 75) and gamma correction processing (step 76) is executed and then first noise removal processing is executed (step 77).

CCD-RAW data that has undergone first noise reduction processing is subjected to synchronization processing (step 78), RGB-YC conversion processing (step 79) and second noise removal processing (step 80).

Next, a contour correction is applied to the luminance data (step 81) and the color difference data is subjected to a color correction by a color difference matrix (step 82). The luminance data that has undergone the contour correction and the color difference data that has undergone the color correction is subjected to JPEG compression (step 83) and the result is recorded on a hard disk 58 (step 84).

Figure 4:
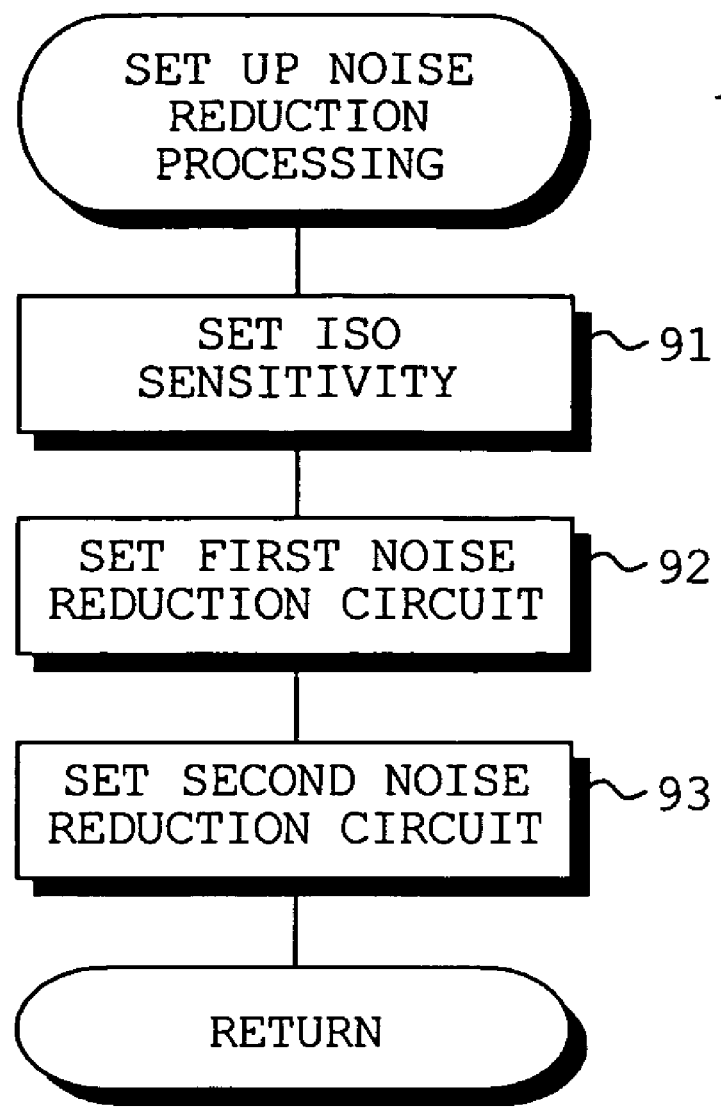
FIG. 4 is a flowchart illustrating processing for making settings in noise reduction processing.

FIG. 4 is a flowchart illustrating processing for setting the noise reduction processing circuits based upon ISO sensitivity.

The ISO sensitivity of the digital still camera is set by the user (step 91) When this is done, parameters for noise reduction are set in the first noise reduction circuit 36 in accordance with this ISO sensitivity (step 92). Furthermore, parameters for noise reduction are set in the second noise reduction circuit 39 in accordance with the set ISO sensitivity (step 93).

Image data before and after application of synchronization processing is subjected to suitable noise reduction processing in the manner described above using the first noise reduction circuit 36 and second noise reduction circuit 39 set as described above.

In the setting of the noise reduction processing circuits described above, the parameters of the first noise reduction circuit 36 and second noise reduction circuit 39 are set based upon the ISO sensitivity set by the user. However, these settings may just as well be made using other information (shooting information, information representing image characteristics, etc.).

Further, in the embodiment set forth above, the first noise reduction circuit 36 and second noise reduction circuit 39 are set based upon the same information. However, it may be so arranged that the information used in setting the first noise reduction circuit 36 is made different from the information used in setting the second noise reduction circuit 39.

For example, the following can be used in setting the first noise reduction circuit 36: the characteristics of the CCD 5, the shading characteristics of the image sensing lens and CCD 5, the above-mentioned ISO sensitivity, white balance gain, linear matrix coefficients, gamma characteristic, dynamic range characteristics of the subject, automatic gain at the time of flash photography, flash unattainment level, shutter speed, subject brightness and dispersion characteristic of the video signal that is output from the CCD. Further, in a case where the light-receiving area of the photodiodes of the CCD has high- and low sensitivity areas of different sizes, the first noise reduction circuit 36 can also be set based upon the combining ratio of the signal obtained from the high-sensitivity area and the signal obtained from the low-sensitivity area. It goes without saying that in a case where the light-receiving area of the photodiodes of the CCD has high- and low-sensitivity areas of different sizes, the signal obtained from the high-sensitivity area and the signal obtained from the low-sensitivity area are input to the digital signal processing circuit 10 and therefore a circuit for combining these signals is required.

Further, the following can be used in setting the second noise reduction circuit 39: lens distortion, color different matrix coefficients, number of recorded pixels, reproduction band, contour correction, zoom position in case of a zoom lens, and the picture-taking scene (portrait, scenery, monochrome, etc.).

Furthermore, the following can be utilized in both the setting of the first noise reduction circuit 36 and the setting of the second noise reduction circuit 39: color aberration characteristics of the image sensing lens, 3D-LUT characteristics and camera operating mode (continuous shooting mode, moving-picture shooting mode, bracket mode, etc.).

Figure 5:
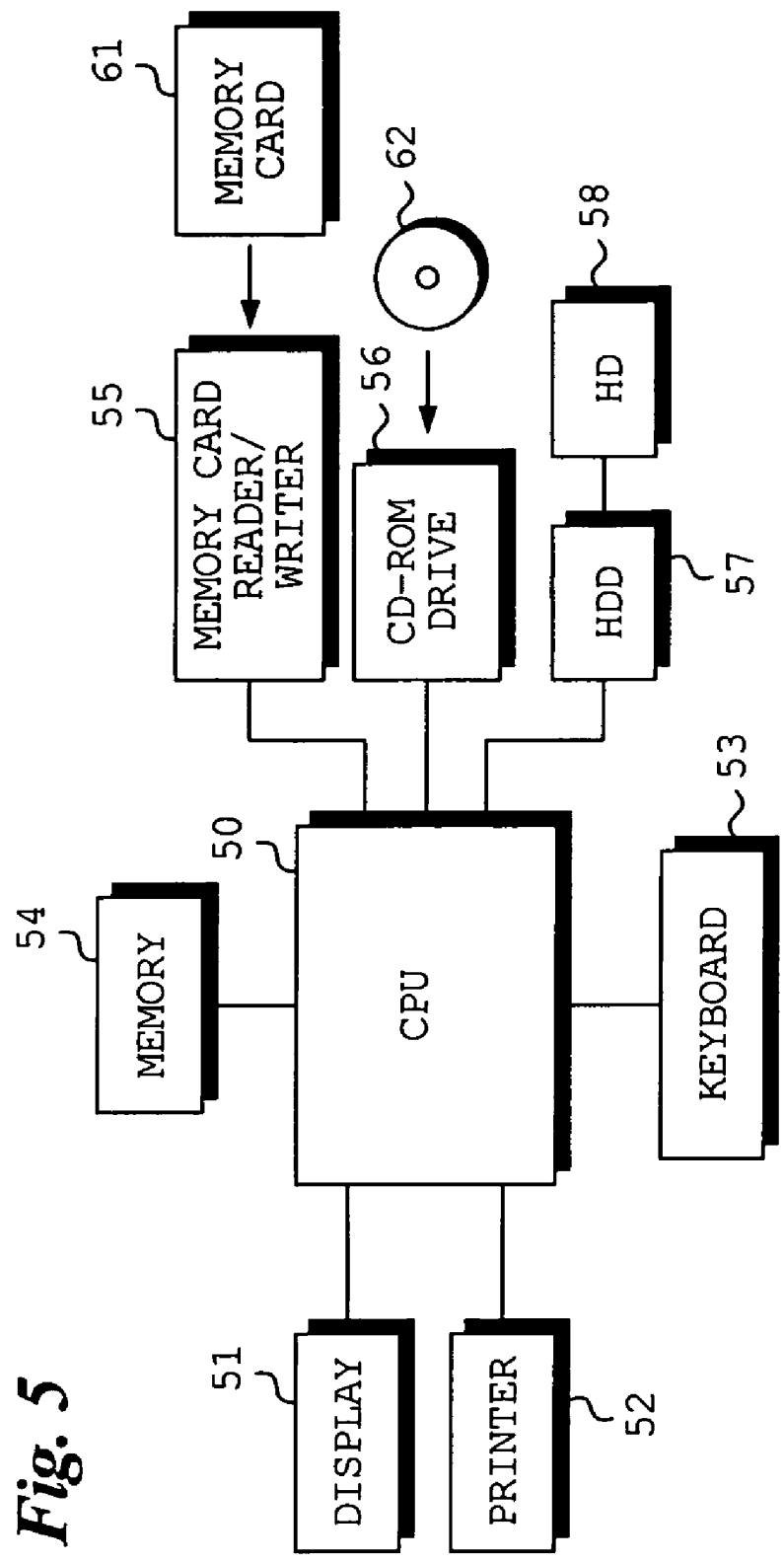
FIG. 5 is a block diagram illustrating the electrical structure of a computer.

FIG. 5 is a block diagram illustrating the electrical structure of a computer system.

The above-described embodiment is such that noise reduction processing is executed in a digital still camera. However, the above-described noise reduction processing can also be executed utilizing a computer system.

The computer system includes a CPU 50 to which have been connected a display unit 51, a printer 52, a keyboard 53 and a memory 54.

Also connected to the CPU 50 is a memory card reader/writer 55. By loading a memory card 61 on which CCD-RAW data has been recorded into the memory card reader/writer 55, the CCD-RAW data is read from the image data recording area of an image file that has been stored on memory card 61 and image characteristic information regarding the CCD-RAW data is read from a header area of this image file. On the basis of the read image characteristic information, the CCD-RAW data is subjected to digital signal processing in the above-described digital signal processing circuit 10. A CD-ROM drive 56 is further connected to the CPU 40, and a program for the above-described digital signal processing has been stored on a CD-ROM 62. If the CD-ROM 62 is loaded into the CD-ROM drive 56, the digital signal processing program will be read from the CD-ROM 62 and installed in the computer. Thus, digital signal processing that includes the first noise reduction processing and the second noise reduction processing can be applied to the CCD-RAW data that has been read from the memory card 61.

Further connected to the CPU 50 is the hard-disk drive 57. CCD-RAW data that has undergone noise reduction processing can be recorded on a hard disk 58 by the hard-disk drive 57.

Noise reduction processing in the first noise reduction circuit 36 will now be described with reference to FIGS. 6 to 13.

The principles of noise reduction processing according to this embodiment will be described first.

Figure 6:
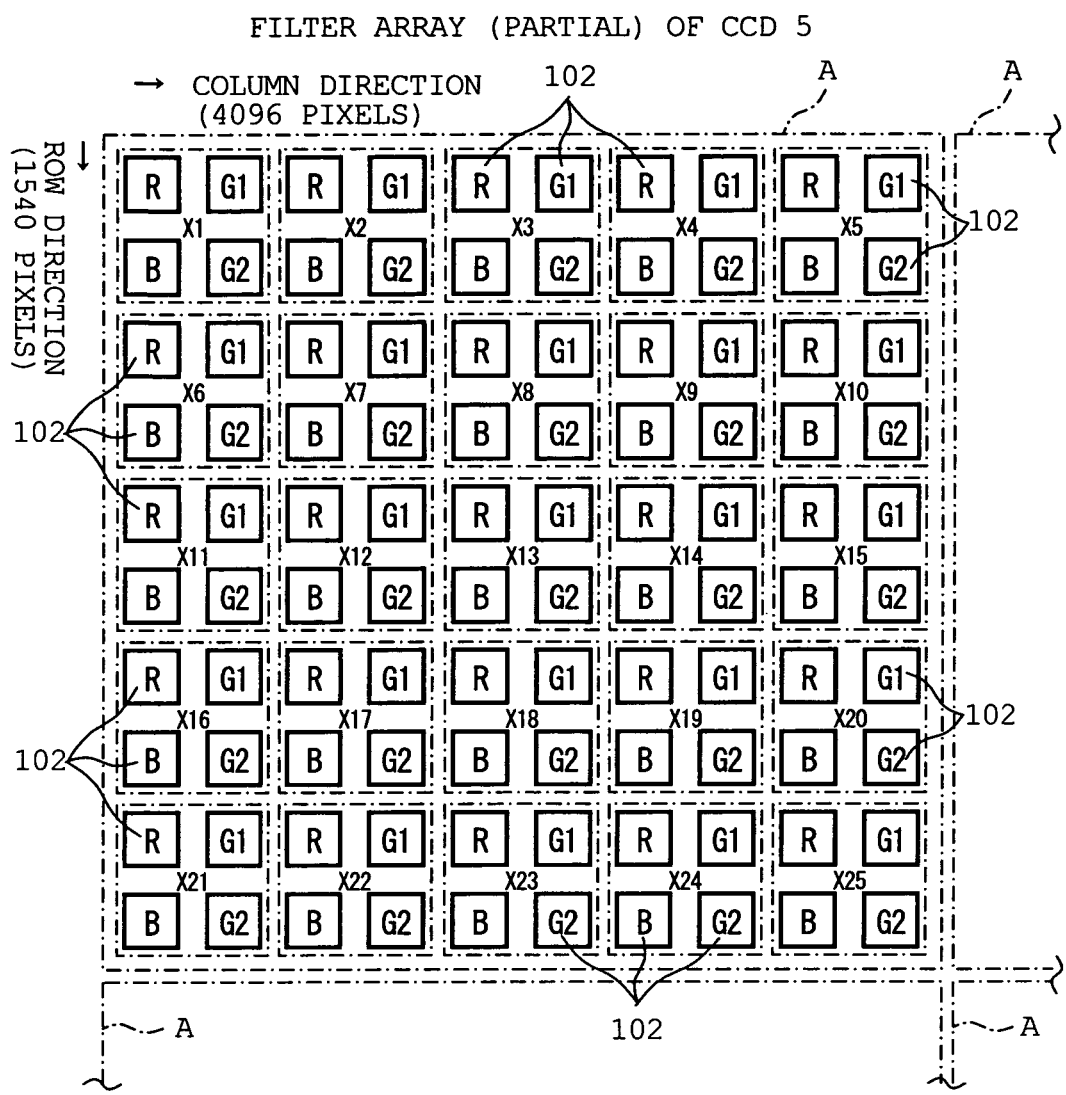
FIG. 6 illustrates part of a CCD filter array.

FIG. 6 illustrates part of the photoreceptor surface of the CCD 5 used in the digital still camera according to this embodiment.

Here 4096 photodiodes 102 are disposed in the column direction of the CCD 5 and 1540 photodiodes 102 in the row direction. Accordingly, image data representing the image of a subject composed of 4096 pixels in the column direction and 1540 pixels in the row direction is obtained by sensing the image of the subject using the CCD 5. The image data obtained from each photodiode 102 corresponds individually to each pixel of the image.

Formed on the photoreceptor surface of each photodiode 102 of the multiplicity thereof is a color filter having a characteristic that passes any one color component among a plurality of color components, namely a red color component, blue color component, first green color component and second green color component (the first and second green color components may have identical characteristics). The filters that pass the red color component, blue color component, first green color component and second green color component have been assigned the characters "R", "B", "G1" and "G2", respectively.

The filters that pass the red light component and the filters that pass the blue light component are formed alternately on the photoreceptor surfaces of the photodiodes 102 in odd-numbered rows. The filters that pass the first green light component and the filters that pass the second green light component are formed alternately on the photoreceptor surfaces of the photodiodes 102 in even-numbered rows.

In this embodiment, noise reduction processing is executed using an area (a noise-reduction target area A), which is composed of ten photodiodes 102 in each of the column and row directions, as a single unit. Although the physical positions (spatial positions) of four photodiodes 102 that adjoin one another in the column and row directions are different, these physical positions are regarded as being the same in this embodiment. Four pixels that correspond to four photodiodes 102 are handled as one set. The noise-reduction target area A contains 25 of these sets (X1 to X25) of photodiodes 102.

When the image of the subject is sensed using such a CCD 5, the CCD 5 outputs CCD-RAW data representing the image of the subject. The CCD-RAW data is such that items of data having color components that are in accordance with the color filters that have been formed on the photoreceptor surfaces of the photodiodes 2 appear serially one row's worth at a time. A pixel is represented by data of any one color component, namely the red color component, blue color component, first green color component or second green color component; it does not possess data of another color component. Data of another color component is interpolated by color interpolation processing.

Figure 7:
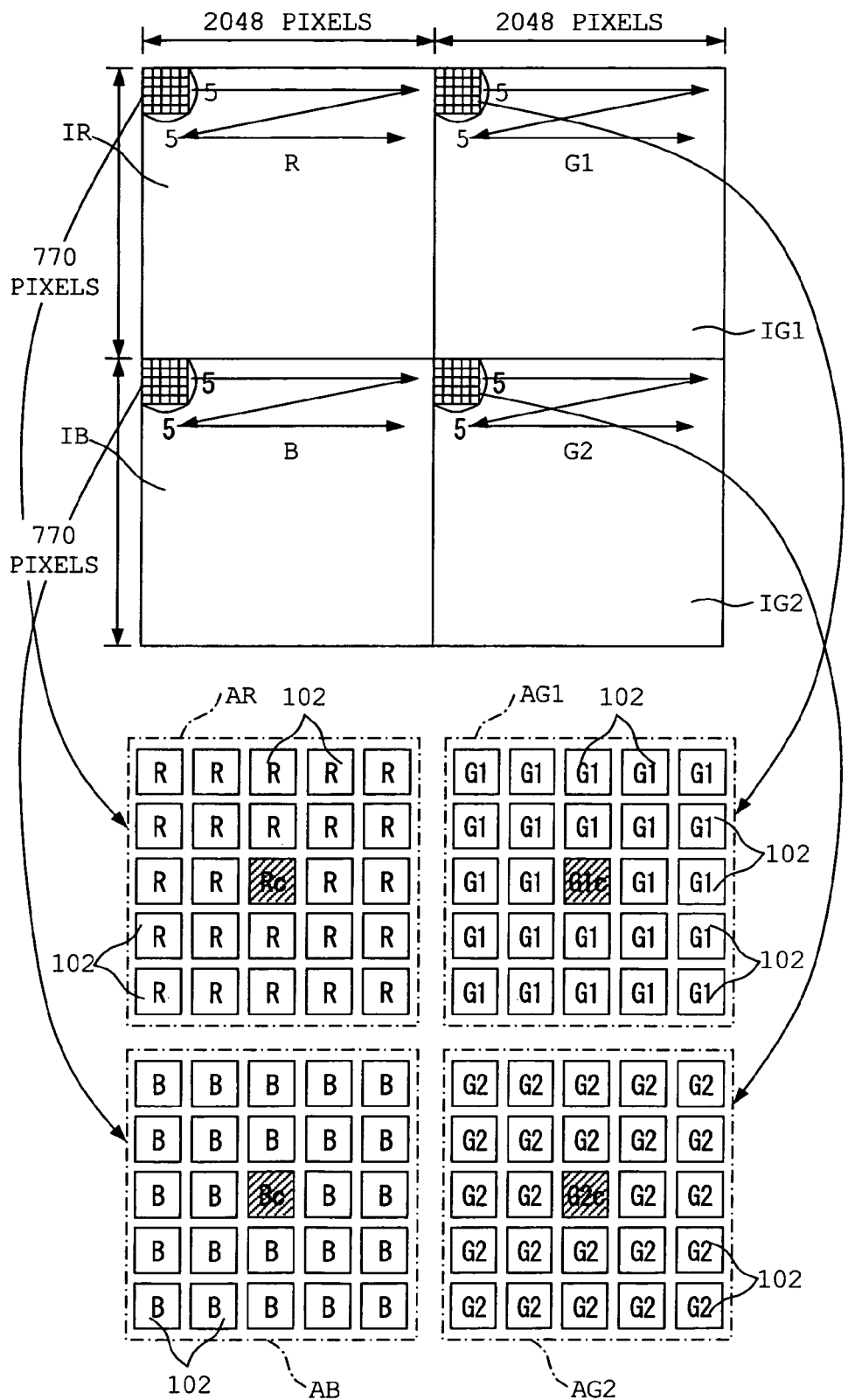
FIG. 7 illustrates arrays of pixels after division according to color.

FIG. 7 illustrates how an image looks after execution of color-component division processing.

In this embodiment, color-component extraction processing (color-component division processing) of CCD-RAW data is executed in such a manner that an array of pixels (this pixel array corresponds to the array of photodiodes 102 in FIG. 6) of an image represented by the CCD-RAW data that has been output from the CCD 5 in the manner described above will represent an image that has been divided on a per-color-component basis.

The image represented by this image data after it has been subjected to color-component division processing has 4096 pixels in the column direction and 1540 pixels in the row direction, as described above. The image after division into color components can be divided into an upper-left area, lower-left area, upper-right area and lower-right area on a per-color-component basis. All of these areas have 2048 pixels in the column direction and 770 pixels in the row direction.

The upper-left area, lower-left area, upper-right area and lower-right area are image portions IR, IG, IG1 and IG2 represented by the image data of the red color component, blue color component, first green color component and second green color component, respectively.

Areas of five pixels in each of the column and row directions in each of these image portions IR, IB, IG1 and IG2 become noise-reduction target areas AR, AB, AG1 and AG2, respectively. The noise-reduction target areas AR, AB, AG1 and AG2 in combination correspond to the noise-reduction target area shown in FIG. 6, as mentioned above.

Pixels Rc, Bc, G1c and G2c at the centers of the noise-reduction target areas AR, AB, AG1 and AG2, respectively, are pixels that are to undergo noise reduction. As will be described later in greater detail, noise reduction processing of the central pixels Rc, Bc, G1c and G2c is executed utilizing the pixels (image data) present in the noise-reduction target areas AR, AB, AG1 and AG2. When noise reduction processing of the central pixels Rc, Bc, G1c and G2c of the noise-reduction target areas AR, AB, AG1 and AG2, respectively, ends, the noise-reduction target areas AR, AB, AG1 and AG2 are each shifted one pixel to the right and noise reduction processing is applied to the pixels Rc, Bc, G1c and G2c located at the centers of respective ones of the noise-reduction target areas AR, AB, AG1 and AG2 thus shifted. Shifting of the noise-reduction target areas and noise reduction processing are thus repeated for one frame of the image.

As mentioned above, the positions of four pixels adjoining one another in the column and row directions in the CCD 5 differ physically but the pixels are regarded as being at the same position in this embodiment. This means that a pixel within the noise-reduction target areas AR, AB, AG1 and AG2 can be expressed by $Xn=(Rn, Gn, Bn, G2n)$. (Since the pixels within the noise-reduction target areas AR, AB, AG1 and AG2 are 25 in number, n=1 to 25 holds.)

FIGS. 8 to 11 illustrate the relationship between color space of the red, blue, first green and second green color components and image data representing a pixel in a noise-reduction target area.

Figure 8:
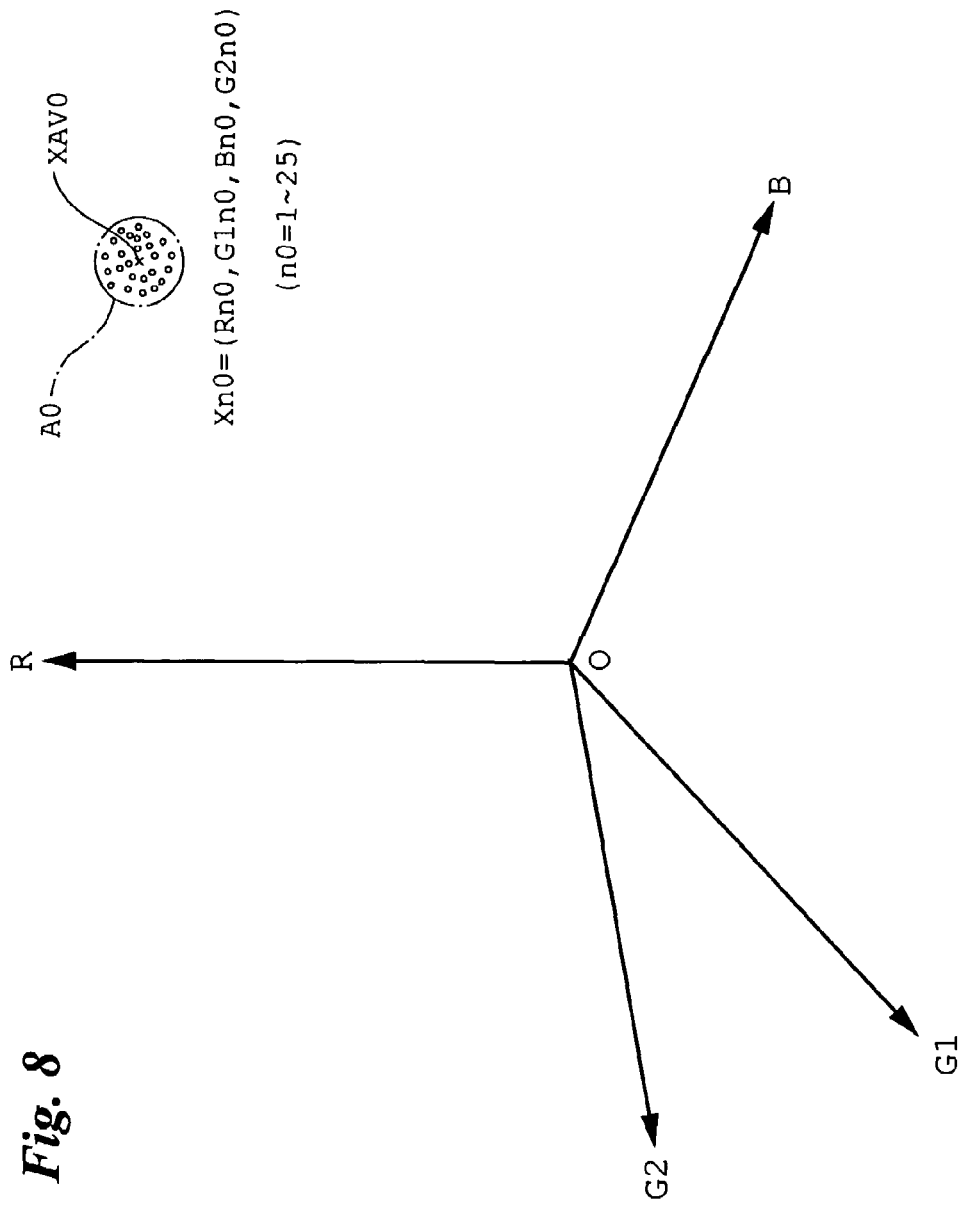
FIGS. 8 to 11 illustrate the relationship between color space and image data.

FIG. 8 illustrates the relationship between the color space and image data representing a pixel in a noise-reduction target area A0 in a case where there is no uncorrelated noise.

The noise-reduction target area A0 is regarded as one having correlativity. Image data representing a pixel Xn0=(Rn0, G1n0, Bn0, G2n0) within the noise-reduction target area A0, therefore, falls within bounds in which the levels of the image data are comparatively consolidated. Average data of pixel Xn0 within the noise-reduction target area A0 is indicated by XAV0.

Figure 9:
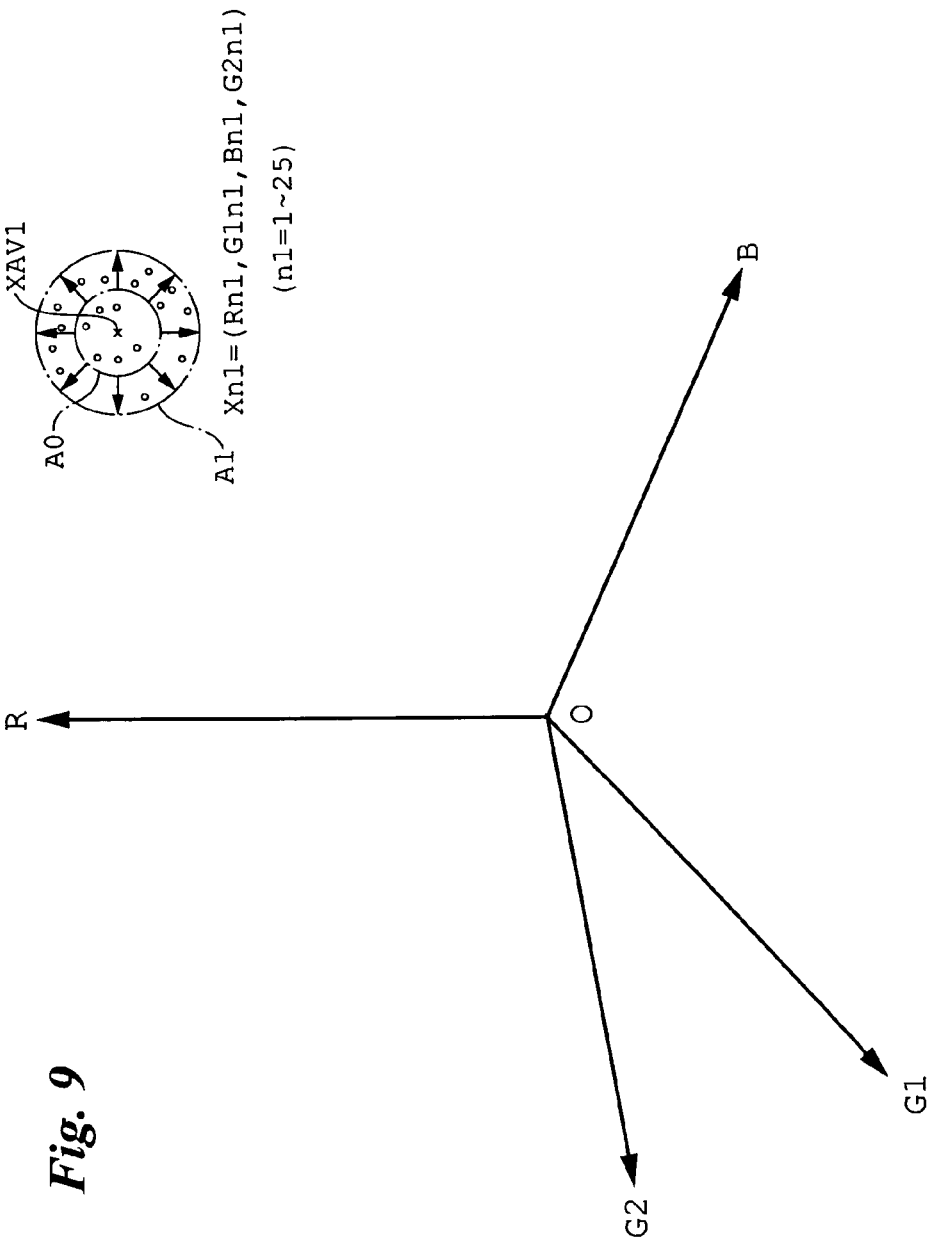

FIG. 9 illustrates the relationship between the color space and image data representing a pixel in a noise-reduction target area A1 in a case where uncorrelated noise is present. The noise-reduction target area A0 for the case where there is no uncorrelated noise also is illustrated for the purpose of comparison.

In a case where uncorrelated noise is present, image data representing a pixel Xn1=(Rn1, G1n1, Bn1, G2n1) within the noise-reduction target area A1 is such that the levels of the image data representing each of the pixels are dispersed owing to the uncorrelated noise. Consequently, the zone of the image data representing pixels in the noise-reduction target area A1 in a case where uncorrelated noise is present is broader than the zone of image data representing pixels in the noise-reduction target area A0 in a case where uncorrelated noise is absent. Further, the average data of pixel Xn0 in the noise-reduction target area A1 is indicated by XAV1.

The first noise reduction circuit 36 according to this embodiment eliminates uncorrelated noise in the manner described above.

Figure 10:
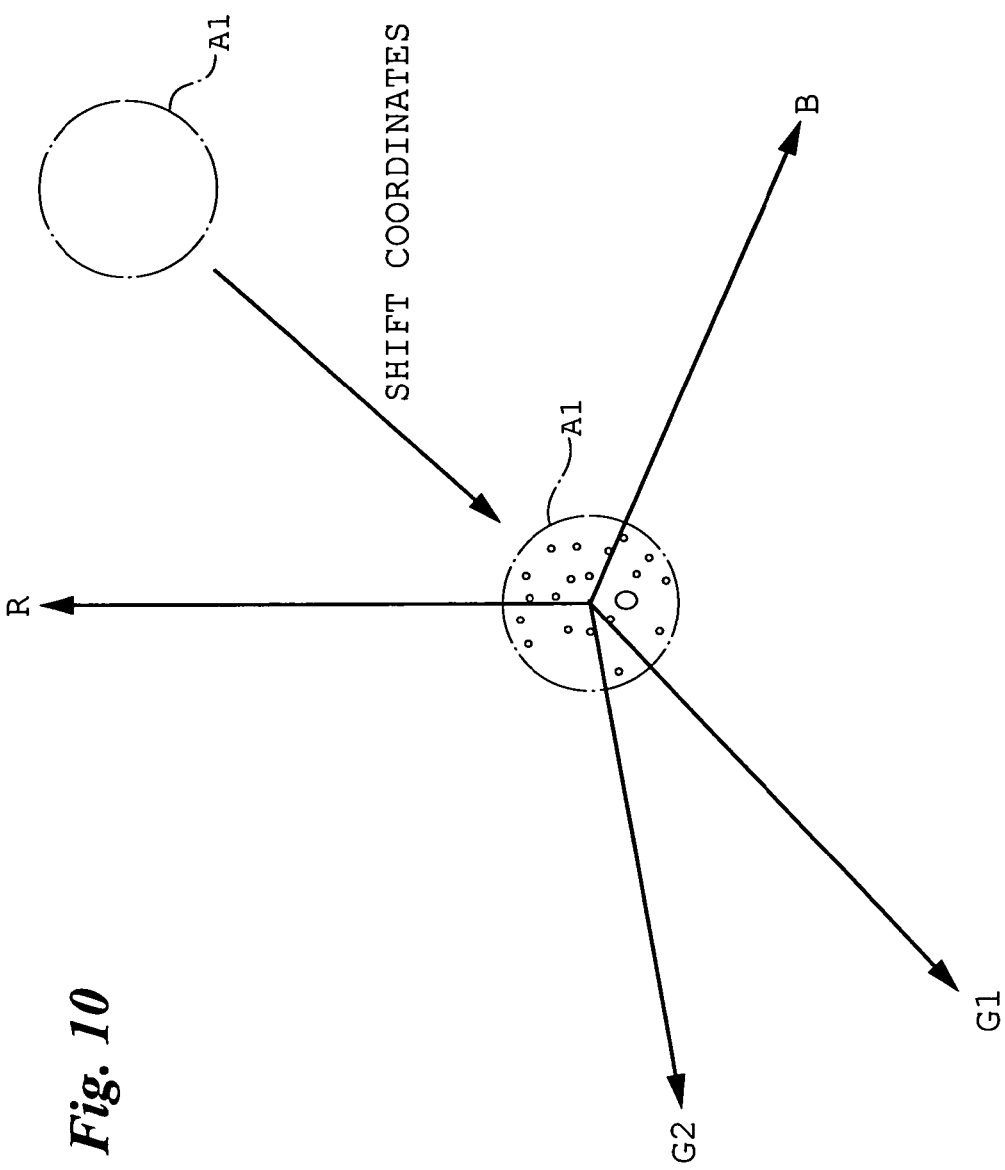

FIG. 10 illustrates the relationship between the color space and image data representing a pixel in the noise-reduction target area A1 at the time of movement of image-data coordinates and filtering for removal of noise.

In a case where noise reduction is executed in this embodiment, all of the image data representing pixel Xn1 in noise-reduction target area A1 undergoes a coordinate shift (level shift) in such a manner that the level of the average data XAV1 of pixel Xn1 in noise-reduction target area A1 will become the origin of the color space. Filtering serving as noise reduction processing is applied to the image data representing the pixel Xn1 in the noise-reduction target area A1 in a state in which all of the image data representing pixel Xn1 in noise-reduction target area A1 has undergone a coordinate shift in such a manner that the average data Xn1 is shifted to the origin position. Since filtering is applied with the average data XAV1 as the position of the origin, comparatively appropriate filtering can be performed.

Figure 11:
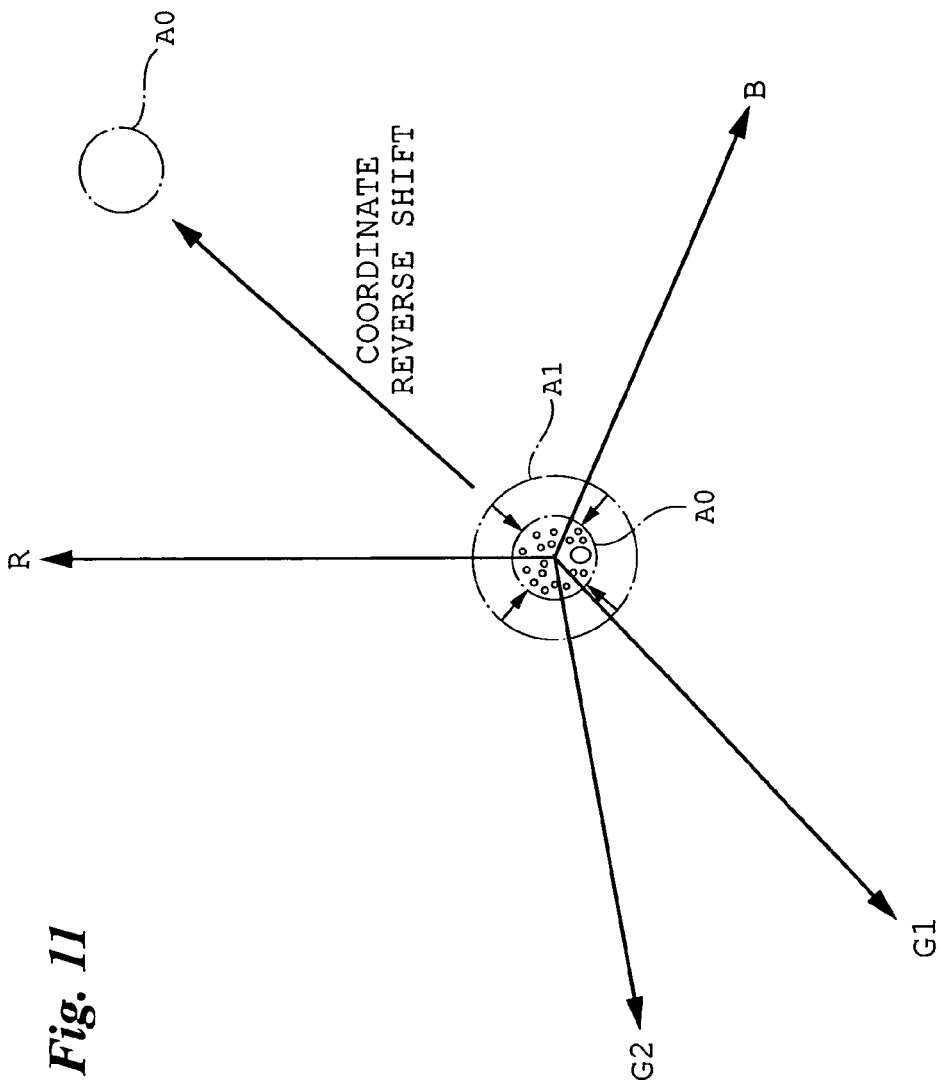

FIG. 11 illustrates the relationship between the color space and image data representing a pixel in the noise-reduction target area A1 at the time of reverse movement of image-data coordinates.

The above-described filtering processing eliminates uncorrelated noise. Owing to this filtering processing, the zone of image data representing a noise-reduction target pixel within the noise-reduction target area A1 falls within (approaches) the zone of image data representing a pixel within the noise-reduction target area A0 in a case where there is no uncorrelated noise. By repeating similar processing also with regard to the remaining pixels in the noise-reduction target area A1, all of the pixels in the noise-reduction target area A1 fall within (approach) the zone of the image data representing pixels in the noise-reduction target area A0.

When the image data representing the pixel Xn1 in the noise-reduction target area A1 is subjected to filtering as noise reduction processing in a state in which all of the image data representing the pixel Xn1 in the noise-reduction target area A1 has had its coordinates shifted, as mentioned above, a coordinate reverse-shift (a level reverse-shift) is performed in such a manner that the average data XAV1 returns to the position that prevailed prior to the shift of coordinates. Noise reduction processing is thus completed.

Figure 12:
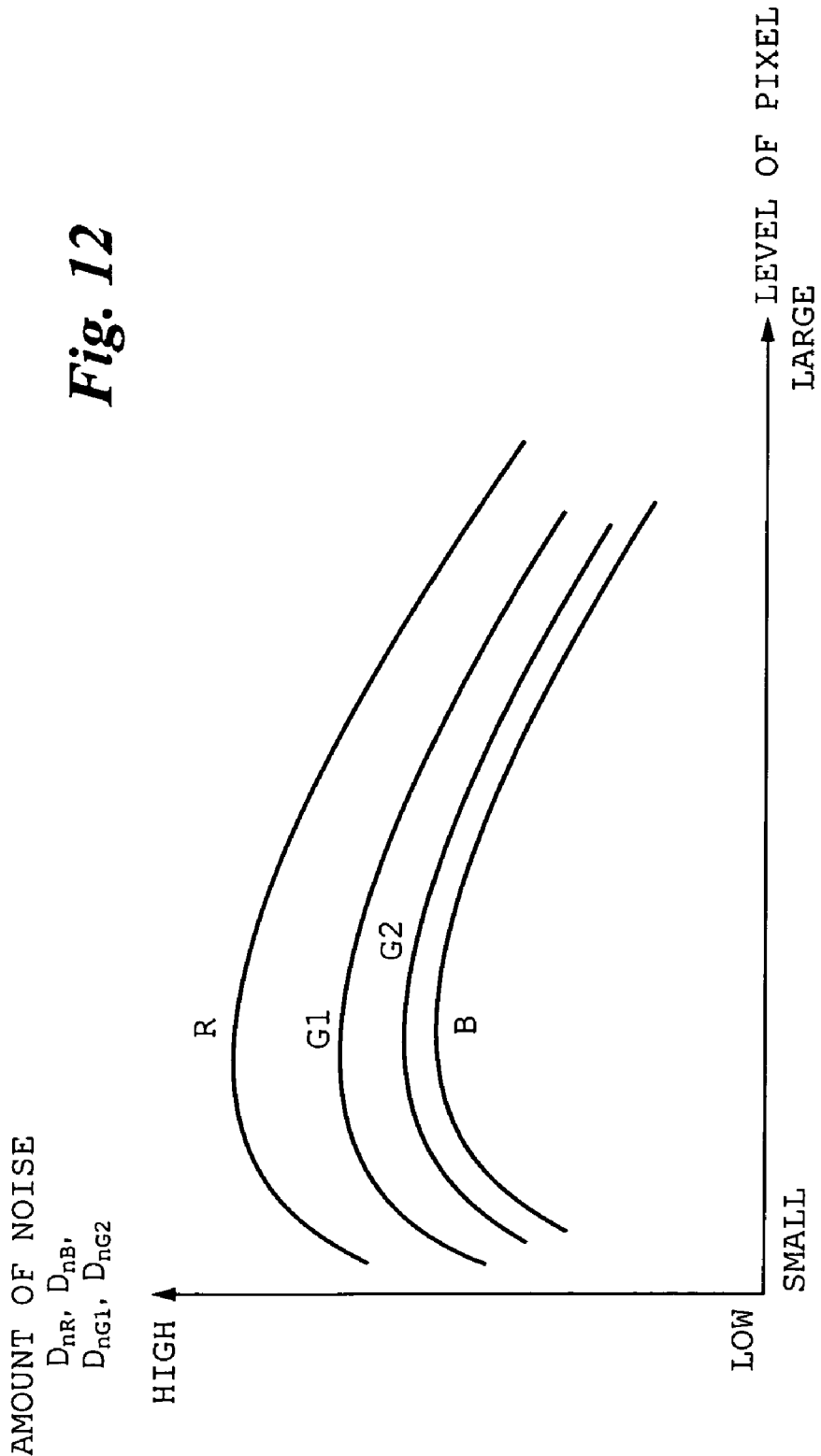
FIG. 12 illustrates the relationship between standard deviation of noise and pixel values.

FIG. 12 illustrates the relationship between amount of noise used in noise reduction processing and pixel values.

In noise reduction processing according to this embodiment, the image of a prescribed reference subject is sensed and an amount Dn of noise is analyzed in advance for every pixel level of each of a red color component, blue color component, first green color component and second green color component.

As the pixel levels of the red color component, blue color component, first green color component and second green color component become greater, noise amounts $D_{nR}$, $D_{nB}$, $D_{nG1}$ and $D_{nG2}$ of these color components, respectively, increase and peak at certain values. If the pixel values increase further, then the noise amounts $D_{nR}$, $D_{nB}$, $D_{nG1}$ and $D_{nG2}$ gradually decrease.

This relationship between the noise amounts $D_{nR}$, $D_{nB}$, $D_{nG1}$ and $D_{nG2}$ and pixel levels of each of the color components is analyzed beforehand and stored. The stored noise amounts $D_{nR}$, $D_{nB}$, $D_{nG1}$ and $D_{nG2}$ are utilized in noise reduction processing, described later.

Although the above-mentioned noise amounts $D_{nR}$, $D_{nB}$, $D_{nG1}$ and $D_{nG2}$ can also be utilized as is, gain WBG of the gain correction circuit (white balance adjustment circuit) 32 in the digital signal processing circuit 10 may be utilized. A noise amount $D_{nG1}(\gamma)$ in a case where the gain WBG of the gain correction circuit 32 is utilized is represented by the Equation (1) below.

$$D_{nG1}(\gamma)=D_{nG1}\times[WBG]^{\gamma} \quad \text{Equation (1)}$$

In Equation (1), the gain WBG of gain correction circuit 32 is multiplied by γ because CCD-RAW data following a γ conversion is subjected to noise reduction processing in this embodiment. It goes without saying that in a case where noise reduction processing is applied to CCD-RAW data prior to the γ conversion, gain WBG not multiplied by γ is utilized. The noise amount $D_{nG2}(\gamma)$ of the second green color component also is obtained in similar fashion. In a case where noise reduction processing is applied to CCD-RAW data before the color balance adjustment, it will suffice to use the noise amount $D_{nG1}$ itself.

The noise amounts $D_{nB}(\gamma)$ and $D_{nR}(\gamma)$ of the blue and red color components are represented by Equations (2) and (3) below, in which [WBG] in Equation (1) has been replaced by [WBG(R/G)] and [WBG(B/G)], respectively.

$$D_{nR}(\gamma)=D_{nR}\times[WBG(R/G)]^{\gamma} \quad \text{Equation (2)}$$

$$D_{nB}(\gamma)=D_{nB}(\gamma)\times[WBG(B/G)]^{\gamma} \quad \text{Equation (3)}$$

It goes without saying that amounts of noise can be calculated (that the first noise reduction circuit 36 can be set) using imaging information other than color balance.

Figure 13:
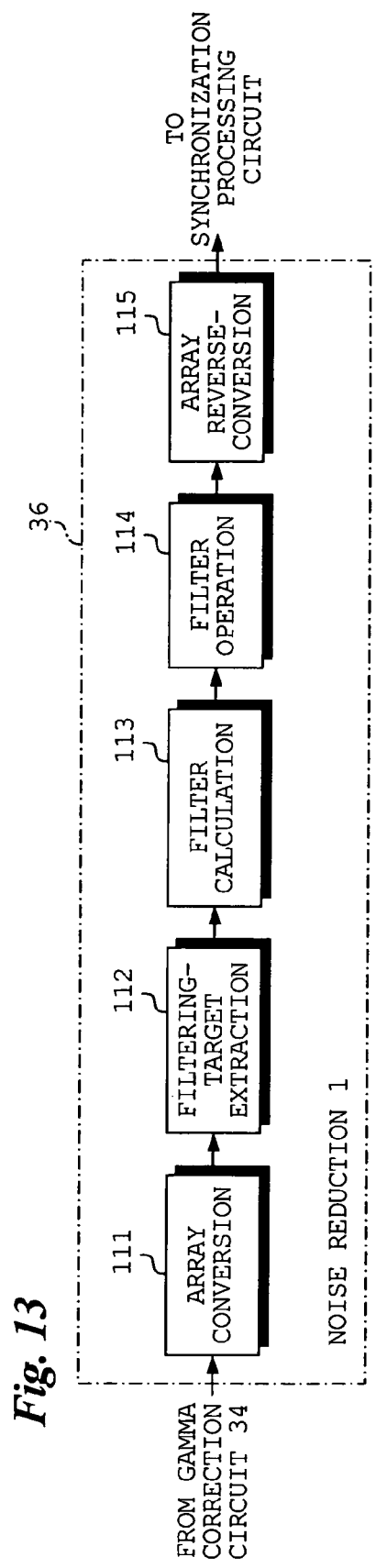
FIG. 13 is a block diagram illustrating the electrical structure of a first noise reduction circuit.

FIG. 13 is a block diagram illustrating the electrical structure of the first noise reduction circuit 36.

When the CCD-RAW data that has been output from the gamma correction circuit 34 enters the first noise reduction circuit 36, the data is input to an array converting circuit 111. The array converting circuit 111 divides the CCD-RAW data, which is output in accordance with the color filter array (see FIG. 6) of CCD 5, on a per-color-component basis in the manner described above.

The CCD-RAW data that has been divided on a per-color-component basis in the array converting circuit 111 is input to a filtering-target extraction circuit 112. The latter extracts CCD-RAW data, which represents pixels in noise-reduction target areas each having five pixels in both the column and row directions (these areas are represented as the noise-reduction target areas AR, AB, AG1 and AG2 in FIG. 7), from the CCD-RAW data that has been divided on the per-color-component basis.

The CCD-RAW data to undergo filtering is input to a filter calculation circuit 113. The latter calculates a filter F in accordance with Equation (4) below.

$$F = \{D_{(s+n)} - \alpha D_n\} D_{(s+n)}^{-1} \quad \text{Equation (4)}$$

where $D_{(s+n)}$ in Equation (4) is a quantity that contains a signal and noise and is represented by Equation (5) below. Further, $\alpha$ is a filter control coefficient.

$$D_{(s+n)} = \begin{bmatrix} D_{(s+n)R} & D_{(s+n)RG1} & D_{(s+n)RB} & D_{(s+n)RG2} \\ D_{(s+n)G1R} & D_{(s+n)G1} & D_{(s+n)G1B} & D_{(s+n)G1G2} \\ D_{(s+n)BR} & D_{(s+n)BG1} & D_{(s+n)B} & D_{(s+n)BG2} \\ D_{(s+n)G2R} & D_{(s+n)G2G1} & D_{(s+n)G2B} & D_{(s+n)G2} \end{bmatrix} \quad \text{Equation (5)}$$

Here a diagonal component of $D_{(s+n)}$ is amount of variance of the signal of each color, and a non-diagonal component is amount of variance of a signal between colors. $D_{(s+n)x}(x=R, B, G1, G2)$ is represented by Equation (6) below, and the non-diagonal component $D_{(s+n)x1gx2}(x1, x2=R, B, G1, G2)$ is represented by Equation (7) below.

Further, Dn in Equation (1) is a quantity solely of noise and is represented by Equation (6) below.

$$D_n = \begin{bmatrix} D_{nR} & 0 & 0 & 0 \\ 0 & D_{nG1} & 0 & 0 \\ 0 & & D_{nB} & 0 \\ 0 & 0 & 0 & D_{nG2} \end{bmatrix} \quad \text{Equation (6)}$$

When the filter F is thus calculated, the calculated filter and the CCD-RAW data representing the pixels in the noise-reduction target area are input to a filter operation circuit 114. The latter performs a filter operation (noise reduction processing) that is based on Equation (7) below.

$$\begin{bmatrix} R_{out} \\ G1_{out} \\ B_{out} \\ G2_{out} \end{bmatrix} = F \begin{bmatrix} R_c - avR \\ G1_c - avG1 \\ B_c - avB \\ G2_c - avG2 \end{bmatrix} + \begin{bmatrix} avR \\ avG1 \\ avB \\ avG2 \end{bmatrix} \quad \text{Equation (7)}$$

In Equation (7), Rout, G1out, Bout and G2out indicate image data of the red color component, first green color component, blue color component and second green color component, respectively, obtained following the filter operation; Rc, G1c, Bc and G2c indicate image data representing noise-reduction target pixels present at the centers of the noise-reduction target areas AR, AG1, AB and AG2 of the red color component, first green color component, blue color component and second green color component, respectively, obtained by color-component division processing; and avR, avG1, avB and avG2 are items of data indicating average values of image data of pixels in the noise-reduction target areas AR, AG1, AB and AG2 of the red color component, first green color component, blue color component and second green color component, respectively, obtained by color-component division processing.

In Equation (7), the levels of image data of pixels in the noise-reduction target areas AR, AG1, AB and AG2 are shifted in the manner described above (see FIG. 5) to the origin position of the color space that has the red color component, first green color component, blue color component and second green color component as its coordinate system by subtracting the data avR, avG1, avB and avG2 indicating the average values of image data of pixels in the noise-reduction target areas AR, AG1, AB and AG2 of the red color component, first green color component, blue color component and second green color component, respectively, from the noise-reduction target pixels Rc, G1c, Bc and G2c present at the centers of the noise-reduction target areas AR, AG1, AB and AG2 of the red color component, first green color component, blue color component and second green color component that have been obtained by color-component division processing. The thus shifted pixels Rc, G1c, Bc and G2c to undergo noise reduction are subjected to filtering processing using the filter F indicated by Equation (4).

When $D_n$ indicated by Equation (6) is calculated from $D_{(s+n)}$ indicated by Equation (5) in the filtering processing using the filter F indicated by Equation (4), the uncorrelated noise of the CCD-RAW data is eliminated because the diagonal component of $D_{(s+n)}$ is subtracted, and the correlativity of the CCD-RAW data is maintained because the non-diagonal component is not subtracted. In other words, uncorrelated noise is removed while the correlativity of the CCD-RAW data is maintained.

By adding the data avR, avG1, avB and avG2 indicating the average values to the noise-reduction target pixels Rc, G1c, Bc and G2c obtained following filtering processing, the noise-reduction target pixels Rc, G1c, Bc and G2c are returned to levels corresponding to the original levels from which noise has been reduced.

In order to prevent parameters from becoming too large and, hence, degradation of the image following noise reduction processing in the above-described noise reduction processing, it is preferred that parameters Dgx and Dnx used in Equations (2) and (5) satisfy the relation of Equation (8) below. Here x=R, G1, B, G2 holds.

$$\text{if } D_{(s+n)} < Dn, \text{ then } D_{(s+n)} = D_n \quad \text{Equation (8)}$$

where X=R, G1, B, G2.

Such noise reduction-processing is repeated with regard to one frame's worth of image data. Of course, if the level of color image data (the level of a pixel to undergo noise reduction) is equal to or greater than a predetermined level, noise reduction processing may be halted.

The image data that has undergone filter processing in the filter operation circuit 114 is input to an array reverse-conversion processing circuit 115. The array of image data that has been divided on a per-color-component basis is returned from the array of the color filters of CCD 5 to the original array of color filters of CCD 5 in the array reverse-conversion processing circuit 115. The output of the array reverse-conversion processing circuit 115 is the output of the noise reduction circuit 36.

Noise reduction processing in the second noise reduction circuit 39 will be described next with reference to FIGS. 14 and 15.

Figure 14:
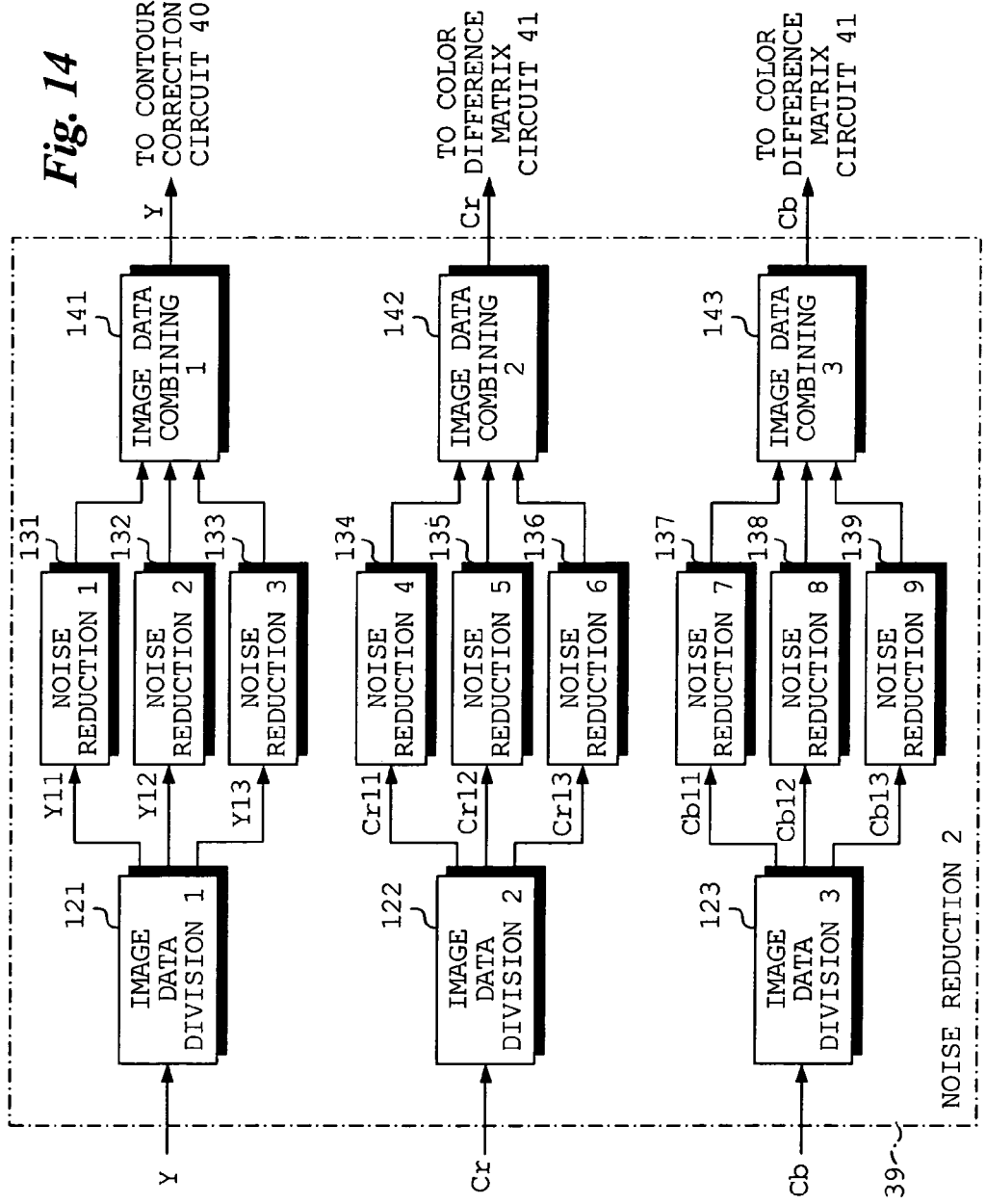
FIG. 14 is a block diagram illustrating the electrical structure of a second noise reduction circuit.

FIG. 14 is a block diagram illustrating the electrical structure of the second noise reduction circuit 39.

The second noise reduction circuit 39, which receives inputs of the luminance data Y and color difference data Cr and Cb, executes noise reduction processing, which is suited to the frequency band, on a per-color-component basis.

The luminance data Y and color difference data Cr and Cb input to the second noise reduction circuit 39 is applied to is input to a first image data dividing circuit 121, second image data dividing circuit 122 and third image data dividing circuit 123, respectively.

The first image data dividing circuit 121, which is for the luminance data Y, divides the entered luminance data into first luminance data Y11, second luminance data Y12 and third luminance data Y13 having frequency components in the low-frequency region, frequency components in the low- and intermediate-frequency regions and frequency components in the low-, intermediate- and high-frequency regions, respectively.

Figure 15A:
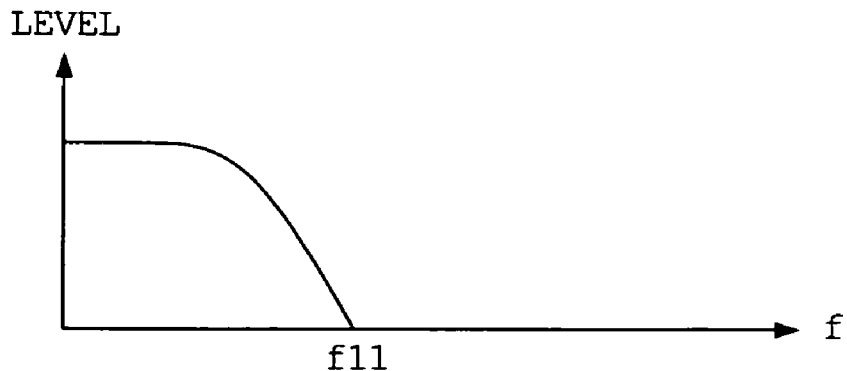
FIGS. 15A, 15B and 15C illustrate characteristics of image data on a per-frequency-component basis.
Figure 15B:
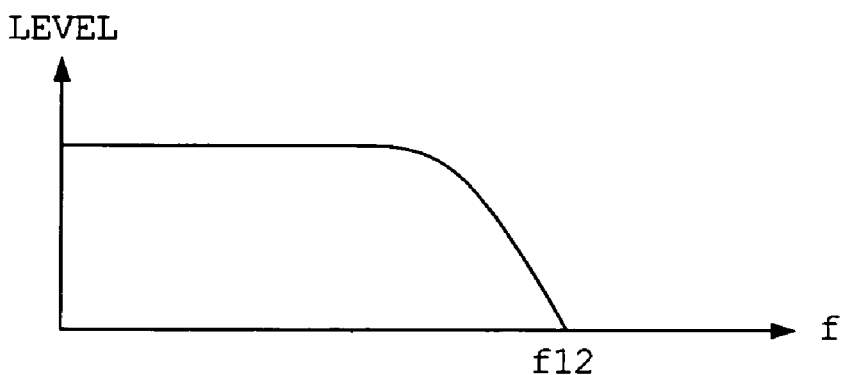
Figure 15C:
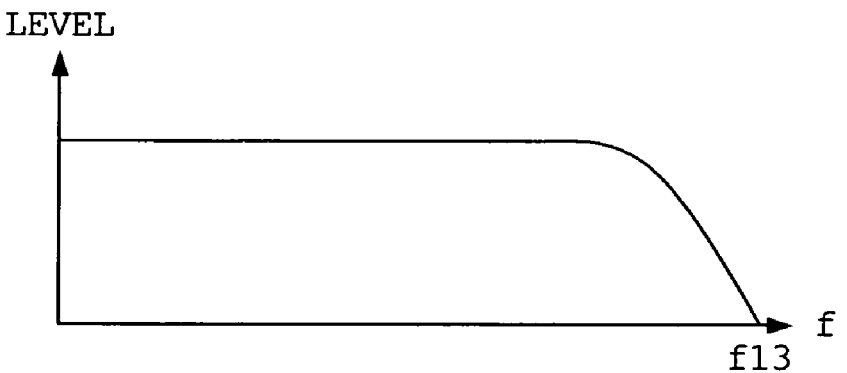

The frequency characteristics of these items of luminance data, namely first luminance data Y11, second luminance data Y12 and third luminance data Y13, thus obtained by division are as illustrated in FIGS. 15A, 15B and 15C, respectively. The first luminance data Y11 has frequency components in a low-frequency region below frequency f11 and does not have frequency components in an intermediate-frequency region and frequency components in a high-frequency region. The second luminance data Y12 has frequency components in low- and intermediate-frequency regions below frequency f12 (f11<f12) and does not have frequency components in a high-frequency region. The third luminance data Y13 has frequency components in low-, intermediate- and high-frequency regions below frequency f13 (f12<f13). Of course, the third image data Y13 is not necessarily limited to frequencies below f13 and may be the input luminance data per se.

The dividing of the luminance data can be performed utilizing processing that employs a multistage linear filter, processing that applies a non-linear level conversion to the output of a linear filter or processing that employs a wavelet transform.

The items of first luminance data Y11, second luminance data Y12 and third luminance data Y13 are input to a noise reduction circuit 131 for low frequencies, a noise reduction circuit 132 for intermediate frequencies and a noise reduction circuit 133 for high frequencies, respectively. A desired band can be emphasized and noise reduction carried out by changing the parameters of the noise reduction circuits 131 to 133. The luminance data Y11, Y12 and Y13 that has been output from the first, second and third noise reduction circuits 131, 132 and 133, respectively, is applied to a first image data combining circuit 141 and luminance data representing one frame of an image is obtained.

The second image data dividing circuit 122, which is for the color difference data Cr, divides the color difference data into first color difference data Cr11, second color difference data Cr12 and third color difference data Cr13 having frequency components in the low-frequency region, frequency components in the low- and intermediate-frequency regions and frequency components in the low-, intermediate- and high-frequency regions, respectively. The items of first color difference data Cr11, second color difference data Cr12 and third color difference data Cr13 are input to first, second and third noise reduction circuits 134, 135 and 136, respectively, which have been set to parameters suited to noise reduction of frequency components in the low-frequency region, frequency components of the low- and intermediate-frequency regions and frequency components of the low-, intermediate- and high-frequency regions, respectively. The items of first color difference data Cr11, second color difference data Cr12 and third color difference data Cr13 that have undergone noise reduction are input to a second image data combining circuit 142, which proceeds to generate color difference data Cr representing one frame of an image.

The third image data dividing circuit 123, which is for the color difference data Cb, divides the color difference data into first color difference data Cb11, second color difference data Cb12 and third color difference data Cb13 having frequency components in the low-frequency region, frequency components in the low- and intermediate-frequency regions and frequency components in the low-, intermediate- and high-frequency regions, respectively. The items of first color difference data Cb11, second color difference data Cb12 and third color difference data Cb13 are input to first, second and third noise reduction circuits 137, 138 and 139, respectively, which have been set to parameters suited to noise reduction of frequency components in the low-frequency region, frequency components of the low- and intermediate-frequency regions and frequency components of the low-, intermediate- and high-frequency regions, respectively. The items of first color difference data Cb11, second color difference data Cb12 and third color difference data Cb13 that have undergone noise reduction are input to a third image data combining circuit 143, which proceeds to generate color difference data Cb representing one frame of an image.

Thus, the degree of noise reduction processing can be changed for every color component and every frequency band (or for every color component or every frequency band). For example, in an instance where the input image data is of the kind obtained by taking a picture using light from a tungsten lamp, processing that emphasizes the blue color component may be executed. In this case, noise in the color difference data Cb can be suppressed to a greater degree.

It goes without saying that the color space is not limited solely to luminance data Y and color difference data Cr and Cb and may be another color space such as Lab color space.

Figure 17:
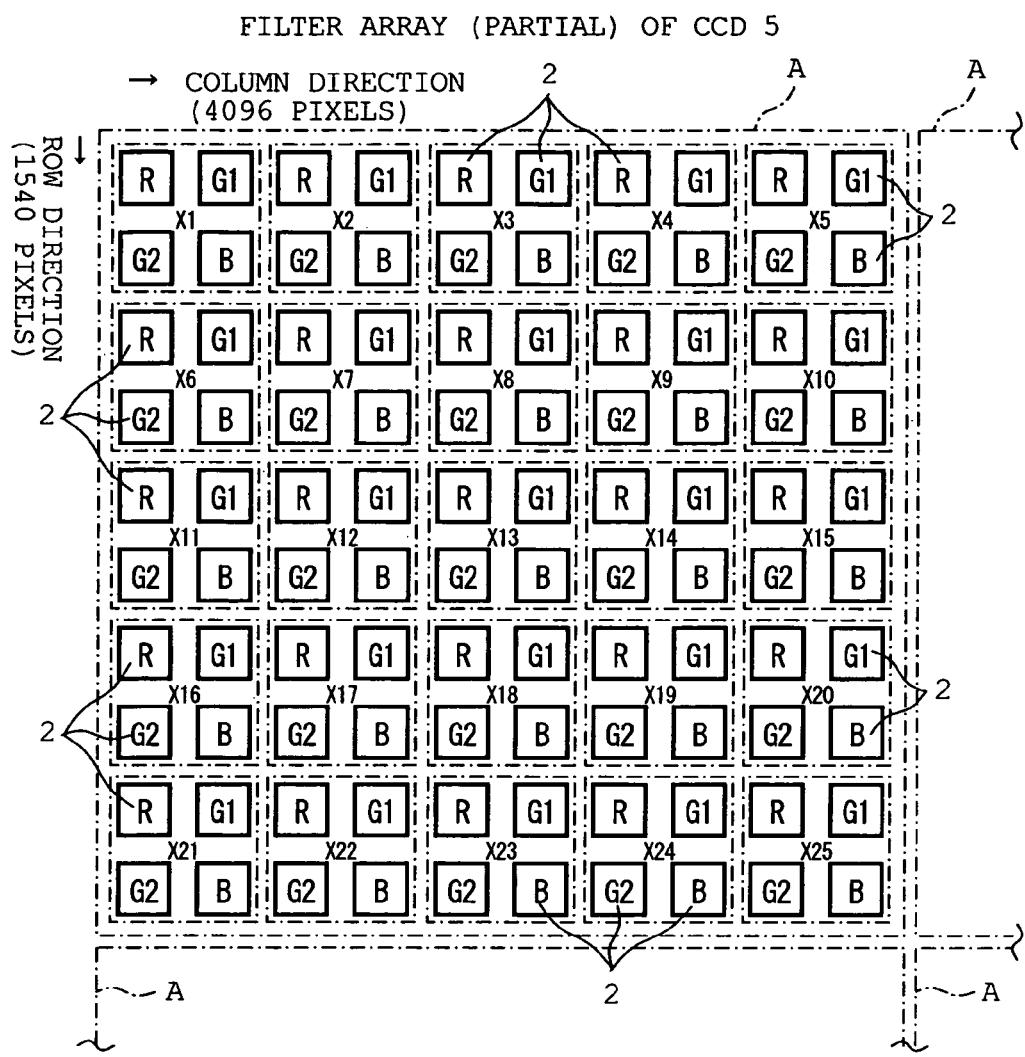

It goes without saying that the embodiment of the present invention is not limited to the above-described filter array and can be applied to any filter array. For example, as shown in FIG. 16, the embodiment is also applicable to a so-called honeycomb array in which a (4n+1)th column, (4n+2)th column, (4n+3)th column and (4n+4)th column are provided in odd-numbered rows with filters having characteristics that pass the red color component, first green color component, blue color component and second green color component, respectively, and the (4n+1)th column, (4n+2)th column, (4n+3)th column and (4n+4)th column are provided in even-numbered rows with filters having characteristics that pass the blue color component, second green color component, red color component and first green color component, respectively. Further, as shown in FIG. 17, the embodiment is also applicable to a so-called Bayer array in which odd-numbered rows and odd-numbered columns are provided with filters having a characteristic that passes the red color component, odd-numbered rows and even-numbered columns are provided with filters having a characteristic that passes the first green color component, even-numbered rows and odd-numbered columns are provided with filters having a characteristic that passes the second green color component, and even-numbered rows and even-numbered columns are provided with filters having a characteristic that passes the blue color component. Thus, this embodiment is applicable if the array of color filters is systematic.

As many apparently widely different embodiments of the present invention can be made without departing from the spirit and scope thereof, it is to be understood that the invention is not limited to the specific embodiments thereof except as defined in the appended claims.

What is claimed is:

1. A noise reduction apparatus comprising:

a first digital noise removal device for inputting raw digital color image data representing an image in which each pixel of a number of pixels constituting one frame of an image has one color component from among a plurality of color components, the color components having distribution that is systematic, and removing uncorrelated noise of a noise-reduction target pixel, which includes the plurality of color components, within a zone around the noise-reduction target pixel, the zone being one having correlativity using a digital filter having filter coefficients which are calculated from statistics of the input raw digital color image data and statistics of a given uncorrelated noise;

a color interpolation device for inputting the color image data from which uncorrelated noise has been removed by said first digital nose removal device, and executing color interpolation processing of the input color image data in such a manner that each pixel of the number of pixels constituting the one frame of the image will have all of the color components of the plurality of color components with the correlativity zone; and a second digital noise removal device for inputting the color image data that has been subjected to the color interpolation processing by said color interpolation device, and removing noise contained in the color image data that has been input by digital signal processing different from the noise-reduction of said first digital noise removal device.

2. The apparatus according to claim 1, wherein said second digital noise removal device is one that executes noise removal conforming to the frequency band of the color image data that has been input.

3. The apparatus according to claim 1, wherein the raw digital color image data input to said first noise removal device represents an image in which each pixel of a number of pixels has one color component from among a plurality of color components of red, blue or green; and said apparatus further comprises:

a YC data generating device for generating luminance data and color difference data from the color image data that has been subjected to the color interpolation processing by said color interpolation device; and said second noise removal device removing noise contained in at least one of the luminance data and color difference data generated by said YC data generating device.

4. The apparatus according to claim 1, wherein said first digital noise removal device inputs color image data that is output from a single-chip solid-state electronic image sensing device in which a number of optoelectronic transducers are arrayed, color filters each having a characteristic that passes light of one color component from among the plurality of color components being formed systematically, for each of the plurality of colors, on photoreceptor surfaces of respective ones of the optoelectronic transducers of the number of optoelectronic transducers.

5. The apparatus according to claim 4, wherein at least one of the processing for removing uncorrelated noise in said first digital noise removal device and the processing for removing noise in said second digital noise removal device is executed based upon at least one of the characteristic of the solid-state electronic image sensing device and shooting information used when a picture has been taken using the solid-state electronic image sensing device.

6. The apparatus according to claim 1, wherein said first digital noise removal device utilizes at least one of non-correlativity of noise between neighboring pixels and non-correlativity of noise between color components.

7. A noise removal method comprising the steps of:

receiving raw digital color image data representing an image in which each pixel of a number of pixels constituting one frame of an image has one color component from among a plurality of color components, the color components having a distribution that is systematic;

removing, using a first digital noise removal device, uncorrelated noise of a noise-reduction target pixel, which includes the plurality of color components, within a zone around the noise-reduction target pixel, the zone being one having correlativity using a digital filter having filter coefficients which are calculated from statistics of the input raw digital color image data and statistics of a given uncorrelated noise;

receiving the color image data from which uncorrelated noise has been removed;

executing, using a color interpolation device, color interpolation processing of the input color image data in such manner that each pixel of the number of pixels constituting the one frame of the image will have all of the color components of the plurality of color components within the correlativity zone;

receiving the color image data that has been subjected to the color interpolation processing; and removing, using a second digital noise removal device, noise contained in the color image data that has been input by digital signal processing different from the step of removing uncorrelated noise of a noise-reduction target pixel.

8. A computer-readable medium having stored thereon a program for controlling a computer to perform the following steps:

inputting raw digital color image data representing an image in which each pixel of a number of pixels constituting one frame of an image has one color component from among a plurality of color components, the color components having a distribution that is systematic, and removing uncorrelated noise of a noise-reduction target pixel, which includes the plurality of color components, within a zone around the noise-reduction target pixel, the zone being one having correlativity using a digital filter having filter coefficients which are calculated from statistics of the input raw digital color image data and statistics of a given uncorrelated noise;

inputting the color image data from which uncorrelated noise has been removed and executing color interpolation processing of the input color image data in such a manner that each pixel of the number of pixels constituting the one frame of the image will have all of the color components of the plurality of color components within the correlativity zone; and inputting the color image data that has been subjected to the color interpolation processing and removing noise contained in the color image data that has been input by digital signal processing different from the step of removing uncorrelated noise of a noise-reduction target pixel.

* * * * *